United States Patent
Watanabe et al.

(10) Patent No.: US 7,171,188 B1
(45) Date of Patent: *Jan. 30, 2007

(54) COMMUNICATION SYSTEM FOR WORKING MACHINES

(75) Inventors: Hiroshi Watanabe, Ushiku (JP); Koichi Shibata, Tsuchiura (JP); Genroku Sugiyama, Inashiki-gun (JP); Toichi Hirata, Ushiku (JP); Hiroyuki Adachi, Tsuchiura (JP); Hideki Komatsu, Kitasoma-gun (JP); Yasushi Ochiai, Nagoya (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 486 days.

This patent is subject to a terminal disclaimer.

(21) Appl. No.: 10/048,007
(22) PCT Filed: May 22, 2000
(86) PCT No.: PCT/JP01/04247
§ 371 (c)(1), (2), (4) Date: Jan. 25, 2002
(87) PCT Pub. No.: WO01/90491
PCT Pub. Date: Nov. 29, 2001

(30) Foreign Application Priority Data
May 26, 2000 (JP) ............................. 2000-156925

(51) Int. Cl.
- H04B 7/00 (2006.01)
- H04M 11/04 (2006.01)
- B60Q 11/00 (2006.01)
- G06F 17/00 (2006.01)
- G06F 11/30 (2006.01)

(52) U.S. Cl. ............................. 455/404.1; 455/404.2; 455/66.1; 455/419; 340/441; 340/459; 340/461; 701/29; 701/31; 701/35; 702/184; 702/34; 702/179

(58) Field of Classification Search ............. 455/404.1, 455/404.2, 412.2, 414.4, 419, 423, 66.1; 340/441, 459, 461; 701/29, 31, 35; 702/184, 702/34, 179
See application file for complete search history.

(56) References Cited

U.S. PATENT DOCUMENTS 6,154,658 A * 11/2000 Caci ........................... 455/466

(Continued)

FOREIGN PATENT DOCUMENTS

| JP | 07-166582 | 6/1995 |
| JP | 8-144312 | 6/1996 |

(Continued)

Primary Examiner—Matthew Anderson
Assistant Examiner—Yuwen Pan
(74) Attorney, Agent, or Firm—Crowell & Moring LLP (57) ABSTRACT

Provided is a communication system for working machines, which makes it possible to transmit desired messages from sites, where the working machines are arranged, to their corresponding work administration centers at timings as needed. When a mail switch 10 arranged on a working machine 7 is operated to send information to a server 1, a terminal user-company identification unit 14 identifies, on the basis of a terminal information database 18, a user to which the information so received is to be sent. A user-company-dependent mail selection unit 15 selects customer information 19*a* on the user from a customer database 19. At a transmission mail creation unit 16, a corresponding new message 16*a* is created. The mail is then transmitted from a mail output unit 17. In this manner, a desired message can be sent from each working machine 7 at a remote location to the corresponding user at a timing as needed.

8 Claims, 7 Drawing Sheets

U.S. PATENT DOCUMENTS 6,211,791 B1 * 4/2001 Ponce de Leon et al. .. 340/601
6,330,499 B1 * 12/2001 Chou et al. ................... 701/33
6,745,153 B2 * 6/2004 White et al. ................ 702/184
6,972,669 B2 * 12/2005 Saito et al. ................. 340/438

FOREIGN PATENT DOCUMENTS

JP      10-222227      8/1998
JP      11-024744      1/1999

* cited by examiner

COMMUNICATION SYSTEM FOR WORKING MACHINES

TECHNICAL FIELD

This invention relates to a communication system for working machines such as hydraulic excavators, which automatically distributes predetermined information from each of the working machines to its corresponding user station via a control station arranged at a remote location.

BACKGROUND ART

Conventional art of this kind includes, for example, the working machine maintenance system disclosed in JP 7-166582 A. This conventional art features that, when a communication is made from an operator of a working machine to the effect that a trouble has occurred on the working machine, data stored in a controller of the working machine are automatically transmitted to a control station via a communication means such as radiocommunication or a telephone line in accordance with an instruction from the side of the control station.

As conventional art different from the foregoing, there is, for example, the machine malfunction monitoring system and method disclosed in JP 11-65645 A. This conventional art features that, when a malfunction is detected during operation of a machine such as a construction machine, data of the malfunction are automatically transmitted from the machine to a monitoring station at a remote location, in other words, a control station via a communication network.

The above-mentioned prior art are each designed such that upon occurrence of a malfunction on a working machine such as a construction machine, data of the malfunction are automatically transmitted to a control station arranged at a remote location. Accordingly, they are effective for repair work of the malfunctioned working machine. These conventional art are, however, intended specifically for the occurrence of a malfunction, and cannot be used for the communication of a message other than the malfunction, such as a desired message corresponding to a given situation, for example, when an urgent contact with a work administration center is desired to report the completion of work or to review a schedule of work in view of the weather or the like or when it is desired to take measures in advance of occurrence of a malfunction.

According to the above-described prior art, information on a malfunction is sent only to a control station which is managed by the maker of the working machine, and no communication means to a user is referred to. The message relating to the above-mentioned work, however, has to be promptly transmitted to a work administration center, for example, the owner or the like of the working machine rather than the maker.

With the foregoing problem in view, the present invention has as an object the provision of a communication system for working machines, which can communicate messages corresponding to given situations, especially desired messages to respective users from sites, where working machines are arranged, to their corresponding work administration centers at timings as needed by radiocommunication.

DISCLOSURE OF THE INVENTION

To achieve the above-mentioned object, the present invention is characterized in that in a communication system for working machines, said system comprising controllers arranged on the working machine, respectively, for transmitting predetermined informations from the respective working machines, a control station arranged at a remote location and connected to the controllers via a radiocommunication means such that the predetermined information outputted from each of the controllers is inputted in the control station, and a plurality of user stations connected to the control station via a network, the working machines are each provided with a transmission instructing means for instructing transmission of the corresponding predetermined information; and the control station is provided with an identification means for identifying from the inputted information the corresponding one of the user stations, to which the information is to be transmitted, and also with a transmission means for transmitting information, which corresponds to the inputted information, to the corresponding user station identified by the identification means.

At a stage, for example, that an operator of one of the working machines has operated its transmission instructing means in the present invention constituted as described above, the predetermined information is transmitted from the corresponding controller and is then sent to the control station at the remote location via the radiocommunication means. When the thus-sent information is inputted, the control station identifies the corresponding one of the user stations, to which the information is to be transmitted, in other words, the corresponding specific user station.

Information, which corresponds to the inputted information, is then outputted from the transmission means and sent to the corresponding user station via the network.

According to the present invention, the operator of each working machine can, therefore, send necessary information to the remote location by operating the transmission instructing means as needed. On the other hand, the inputted information is automatically sent by the control station to the corresponding user station, for example, a corresponding work administration center. Accordingly, messages corresponding to situations, especially messages desired by individual users can be independently communicated from sites, where the machines are arranged, to the corresponding work administration centers at timings as needed via the radio communication means.

BEST MODES FOR CARRYING OUT THE INVENTION

The embodiments of the communication system according to the present invention for construction machines will hereinafter be described based on the drawings.

Figure 1:
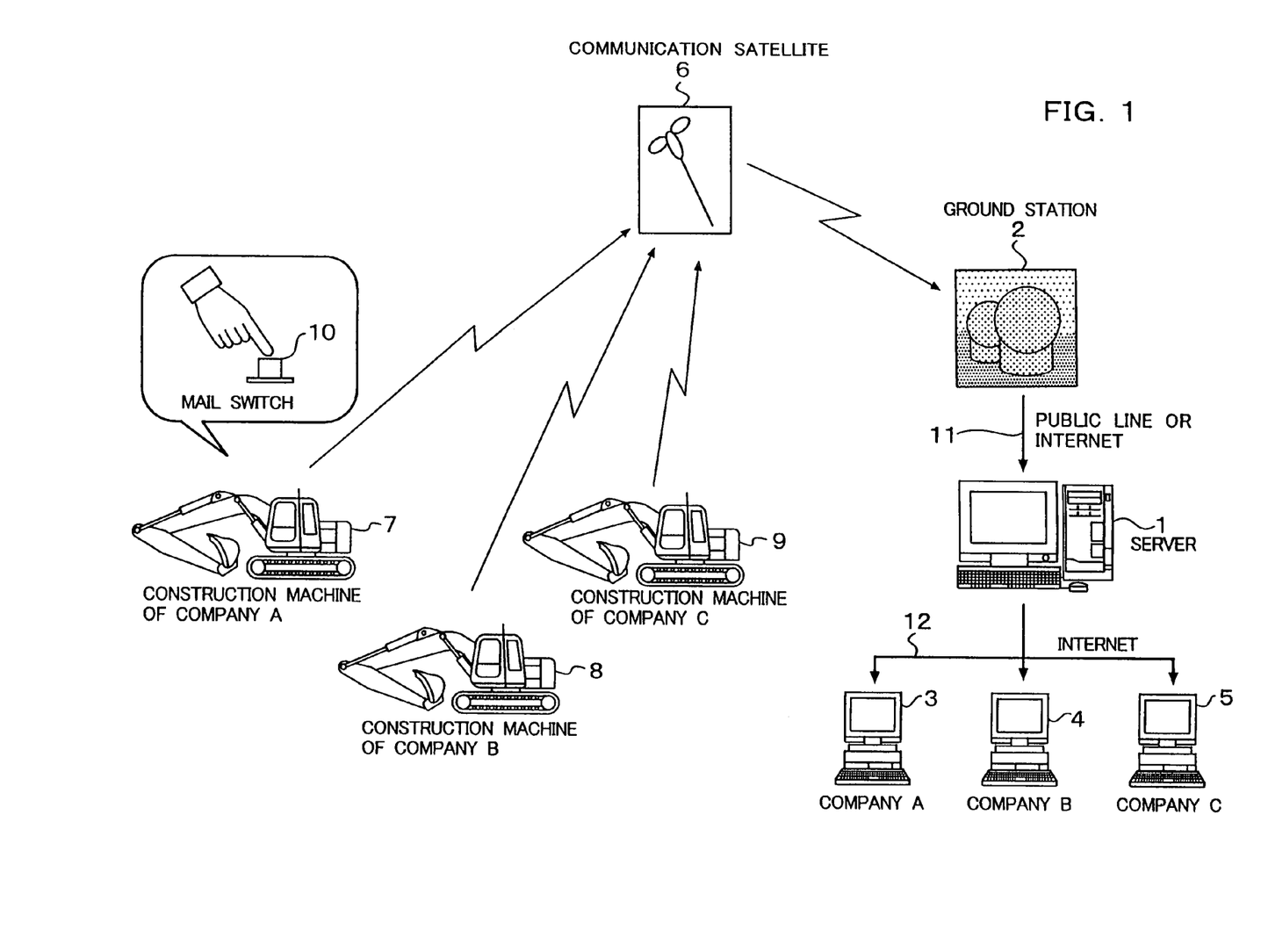
FIG. 1 is a schematic diagram showing an overall construction according to a first embodiment of the present invention.
Figure 2:
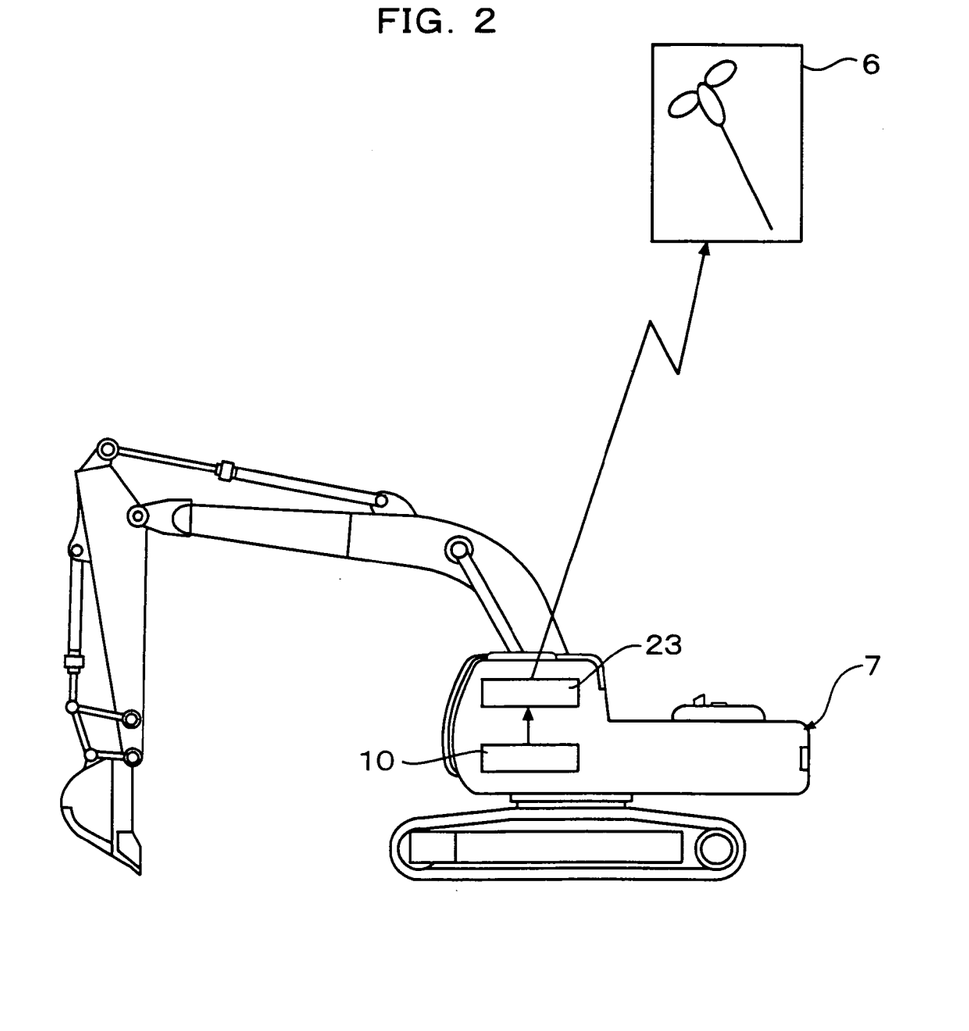
FIG. 2 is a schematic diagram depicting the construction of a communication controller mounted on a hydraulic excavator.

As illustrated in the overall construction diagram of FIG. 1, a communication system according to this embodiment for working machines comprises a communication satellite 6, a ground station 2, and a server 1 as a control station, all of which are arranged to send informations, which are transmitted from plural working machines, for example, hydraulic excavators 7, 8, 9, to their corresponding user stations 3, 4, 5. When information is inputted to the server 1 from one of the hydraulic excavators, the server 1 performs processing as will be described subsequently herein, and then sends the information in the form of e-mail to one of the plural user stations 3, 4, 5 connected to the server 1 via a network, said one user station corresponding to the above-mentioned one of the hydraulic excavators. Here, the ground station 2 and the server 1 are connected with each other via a public line, such as a telephone line, or internet 11, while the server 1 and the user stations 3, 4, 5 are connected with each other via an internet 12. As shown in FIG. 2, the hydraulic excavators 7, 8, 9 are each provided with a communication controller 23 and a mail switch 10 as a communication instructing means for instructing transmission of information.

Figure 3:
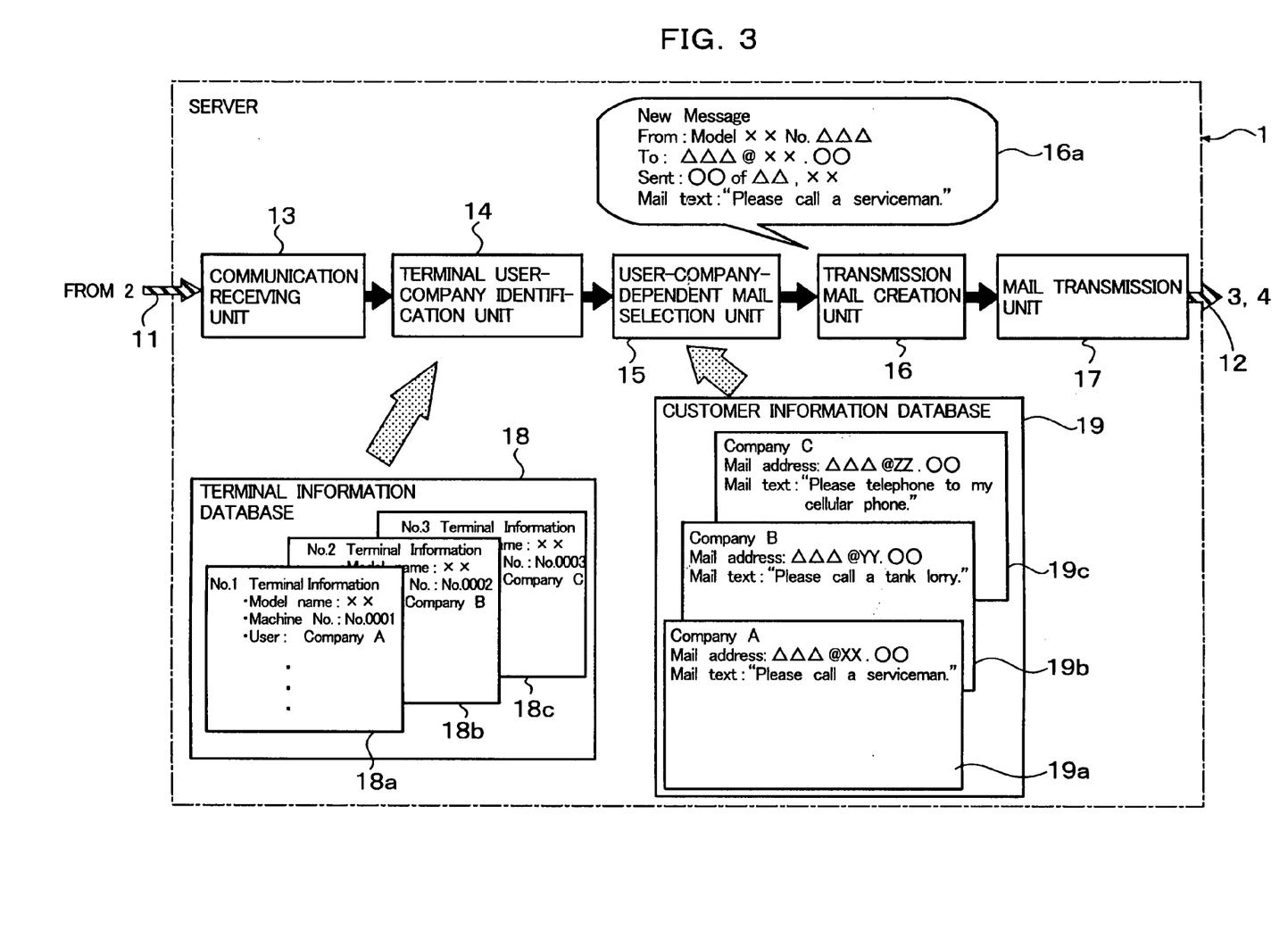
FIG. 3 is a block diagram illustrating the outline construction of a server in the first embodiment of the present invention and a sequence of processing in the server.

As illustrated in FIG. 3, on the other hand, the server 1 which controls input, output and the like of information sent from the hydraulic excavators 7, 8, 9 is provided with a communication receiving unit 13; a terminal user-company identification unit 14 as identification means for identifying, from the inputted informations, user companies of the hydraulic excavators 7, 8, 9 as user stations to which the informations are to be transmitted, respectively; a user-company-dependent mail selection unit 15 as a selection means for selecting one of mail messages registered corresponding to the individual user companies; a transmission mail creation unit 16 for creating a mail to be transmitted; and a mail transmission unit 17 as a transmitting means for transmitting the thus-created mail. The server 1 is also provided with a terminal information database 18 and a customer information database 19. In the terminal information database 18, the model names, excavator numbers and user companies of the individual hydraulic excavators 7, 8, 9 are stored in combination as terminal informations 18a, 18b, 18c. In the customer information database 19, mail addresses and mail texts are stored in combination as customer informations 19a, 19b, 19c separately depending upon the user companies. The mail texts stored in the customer informations 19a, 19b, 19c can be set with contents as desired by the individual customers. By way of example, these mail texts are set as "please call a service man" for Company A, "please call a tank lorry" for Company B, and "please telephone to my cellular phone" for Company C.

In the first embodiment constructed as described above, operation of the mail switch 10 by an operator of the hydraulic excavator 7 owned by Company A results in production of information specific to the hydraulic excavator 7, including its excavator number, at the controller 23, followed by the transmission of the information toward the communication satellite 6. The information transmitted from the hydraulic excavator 7 is sent as radio signals to the ground station 2 via the communication satellite 6. From the ground station 2, the information is sent to the server 1 via the public line 11.

In the server 1, it is confirmed at the communication receiving unit 13 whether or not the information has been transmitted to the server 1.

When the information has been received, the terminal user-company identification unit 14 identifies the corresponding user station, to which the information is to be transmitted, based on the transmitted information. As mentioned above, the information from the hydraulic excavator 7 includes the excavator number as specific identification information. The terminal user-company identification unit 14 reads data corresponding to the excavator number, for example, No. 1 terminal information 18a from the terminal information database 18, and identifies the user company, Company A, which is stored together with the number and model name of the excavator.

After the user company, Company A, has been identified at the terminal user-company identification unit 14, the user-company-dependent mail selection unit 15 selects the customer information 19a on the use company, Company A, from the customer information database 19.

In the customer information 19a, the mail address of Company A and the mail text "please call a serviceman" are stored. The transmission mail creation unit 16 creates a new message 16a, which contains the model name and number of the hydraulic excavator 7 as a sender, the mail address of Company A as the receiver, the date and time of transmission, and the mail text. As the date and time of transmission, the date and time of receipt of the mail by the server 1 from the hydraulic excavator 7 is desired from the viewpoint of communication cost and the like. As an alternative, the controller 23 may also be designed to produce and output signals indicative of the date and time along with the number of the hydraulic excavator 7 at a stage that the mail switch 10 of the hydraulic excavator 7 has been operated.

Subsequent to the creation of the new massage 16a at the transmission mail creation unit 16, the mail transmission unit 17 transmits the mail so that the mail is sent to the user station 3 of Company A via the internet 12. Therefore, the information from the operator of the hydraulic excavator 7 can be immediately read at Company A.

According to the first embodiment, when the operator of any one of the hydraulic excavators 7, 8, 9 simply operates the mail switch 10 as needed, a new message of predetermined content is automatically created and is immediately delivered, for example, to the user company of the hydraulic excavator 7, 8 or 9 as described above. At the user company, a measure can hence be taken in response to the communicated information without delay.

Figure 4:
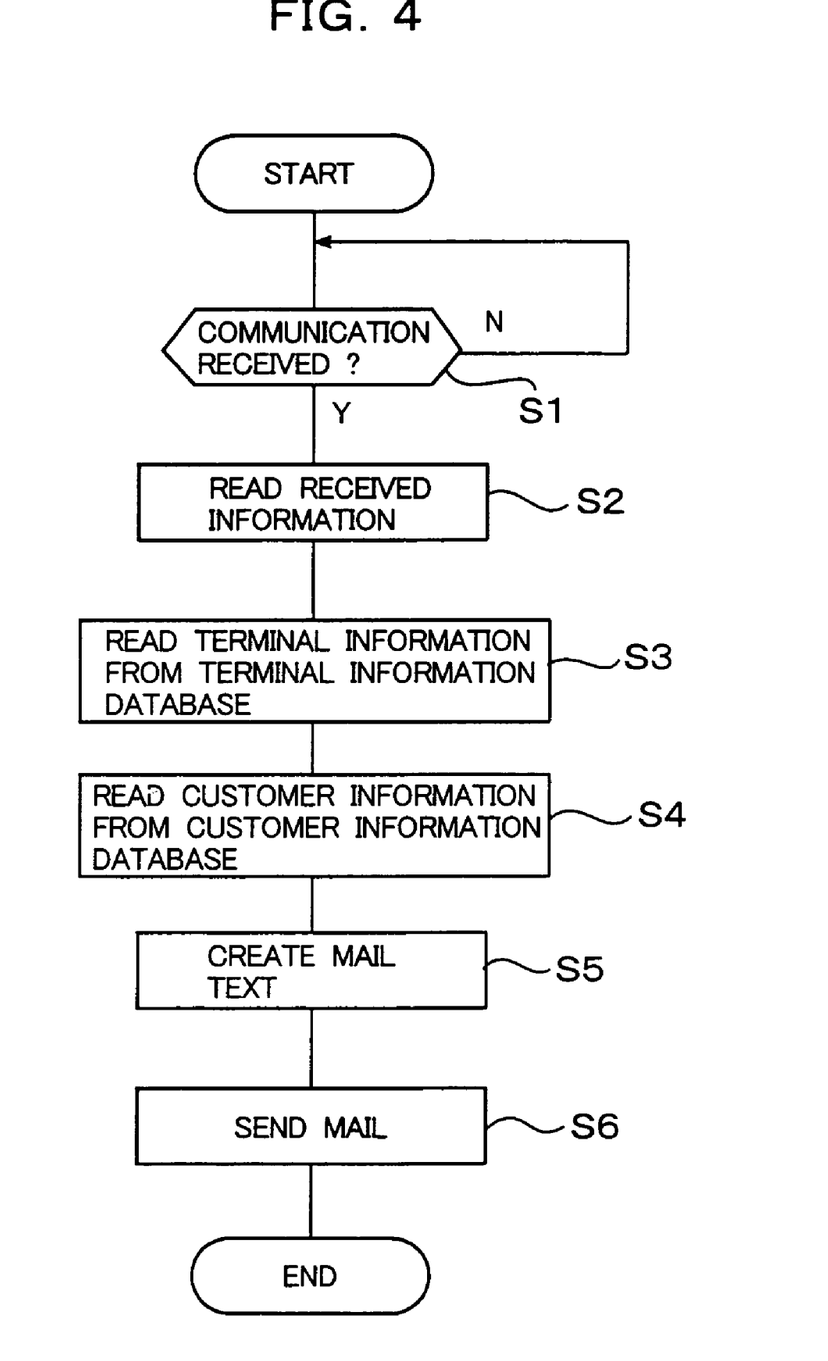
FIG. 4 is a flow chart of the sequence of processing in the server as replaced by software-dependent processing.

In the above-described first embodiment, the individual processing in the server 1 were described to be performed by the corresponding single-purpose means. As illustrated in FIG. 4, however, these processing may be performed as software-dependent processing. Described specifically, when the server 1 receives the information from the hydraulic excavator 7 in step S1, the received information is read in step S2. In step S3, a user company is identified from the terminal information database 18 on the basis of the information read in step S2. In step S4, a mail text corresponding to the user company is subsequently read from the customer database 19. A new message is created in the next step S5, and is then transmitted in step S6.

Based on FIGS. 5 and 6, a description will next be made about the second embodiment of the present invention.

The second embodiment corresponds especially to claim 6.

Figure 5:
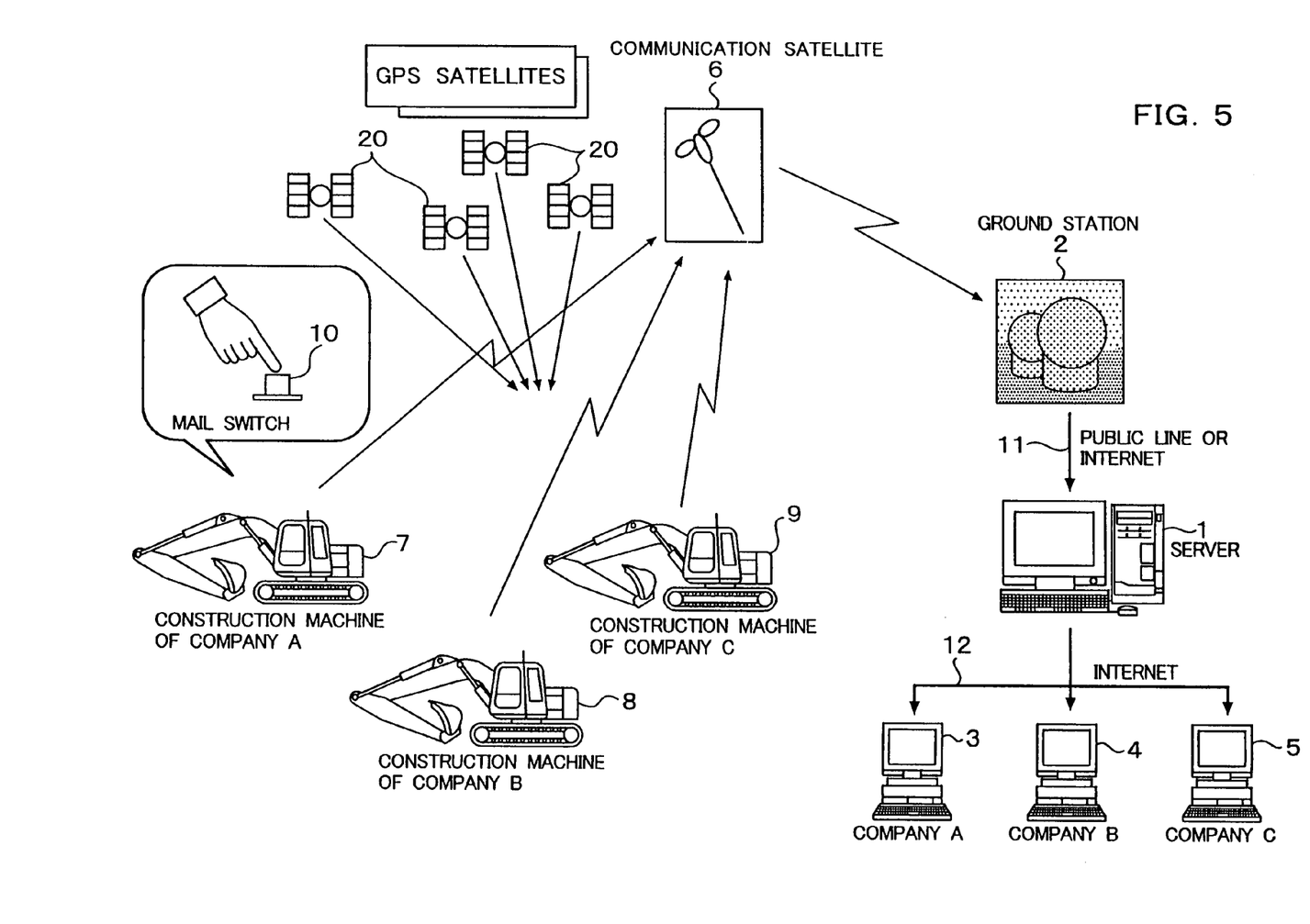
FIG. 5 is a schematic diagram showing an overall construction according to a second embodiment of the present invention.

As shown in the construction diagram of the communication system for working machines in FIG. 5, the hydraulic excavators 7, 8, 9 in the second embodiment are each provided with a position detecting means for receiving signals from GPS satellites 20 to detect its position. The remaining structure is constructed in a similar way as in the above-described first embodiment.

Figure 6:
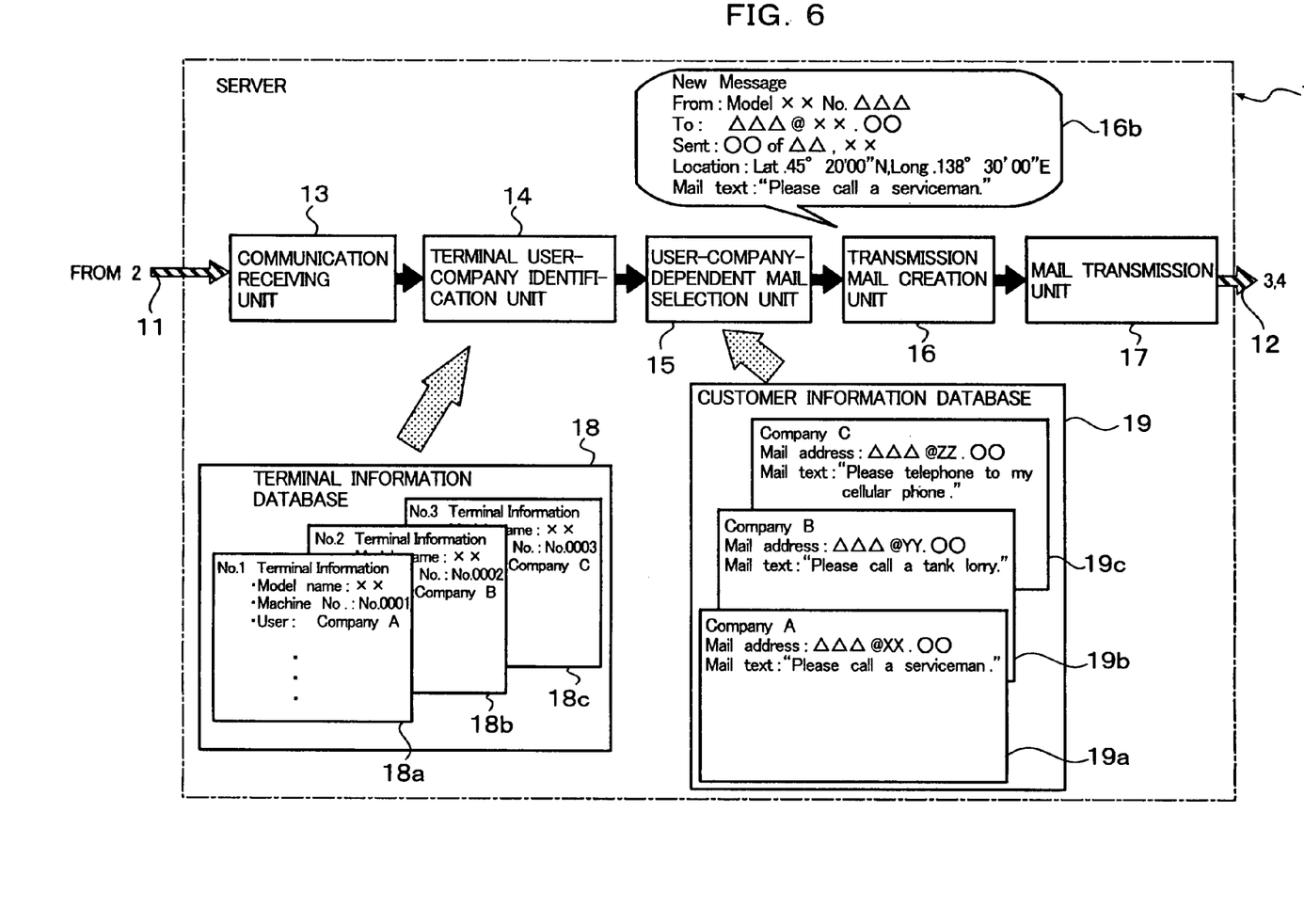
FIG. 6 is a block diagram illustrating a sequence of processing by a server in the second embodiment of the present invention.

As illustrated in the block diagram of FIG. 6, when the operator of the hydraulic excavator 7 owned by Company A, for example, operates the mail switch 10 in the second embodiment constructed as described above, the controller 23 reads signals from the GPS satellites 20 and calculates the current position of the hydraulic excavator 7 on the basis of the signals. Information, which includes the excavator number specific to the hydraulic excavator 7 and information on its position, is then produced at the controller 23, and the information is transmitted toward the communication satellite 6.

The server 1 performs substantially the same processing as in the above-described first embodiment. At a transmission mail creation unit 16, however, a new message of such content as including information on the position of the hydraulic excavator 7 is created as shown at a new message 16b.

In addition to the advantageous effect available from the above-described first embodiment, the second embodiment thus allows the user company to determine the current position of the hydraulic excavator 7 from which the information was transmitted, thereby making it possible to take a measure in response to the transmitted information more promptly without delay.

Based on FIG. 7, a description will next be made about the third embodiment of the present invention.

The third embodiment corresponds especially to claim 5.

Figure 7:
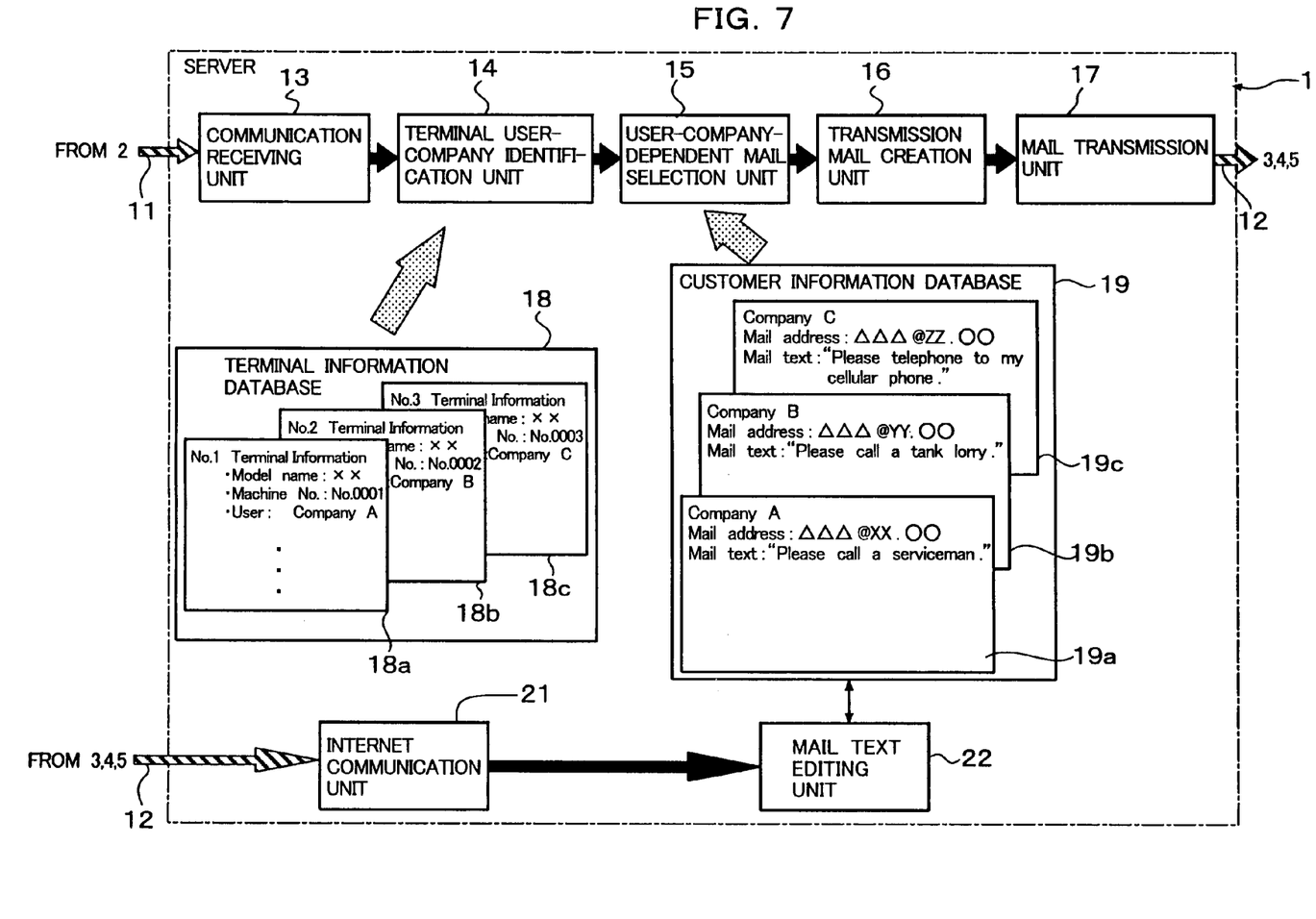
FIG. 7 is a block diagram illustrating a sequence of processing by a server in a third embodiment of the present invention.

As shown in the block diagram of FIG. 7, a server 1 in the third embodiment is provided with an internet communication unit 21 and a mail text editing unit 22, both of which are arranged to permit rewriting of the contents of the mail texts described in the customer information database 19 from the side of the user stations 3, 4, 5. The remaining structure is constructed in a similar way as in the above-described first embodiment.

In the third embodiment constructed as described above, Company B, for example, accesses to the customer information database 19 from the user station 4 via the internet 12, the internet communication unit 21 and the mail text editing unit 22, and reads the customer information 19b on Company B. The mail text editing unit 22 rewrites the mail text from "please call a tank lorry" to, for example, "today's work has been finished", and the mail text of the rewritten content is stored as customer information 19b in the customer information database 19.

In addition to the advantageous effect available from the above-described first embodiment, the third embodiment hence allows each user company to rewrite the mail text into a mail text corresponding to the details of work or the frequency of transmissions of a message, thereby making it possible to efficiently take a measure in response to the communicated information.

The above embodiments were described by providing each hydraulic excavator as a working machine with one mail switch 10 and storing only one mail text as a mail text to be communicated per user company. However, each hydraulic excavator may be provided, for example, with plural mail switches 10, and mail texts corresponding to the individual mail switches may be stored in the customer information database such that the mail text of the content corresponding to operated one of the mail switches can be sent to the user company.

Further, the informations sent from the hydraulic excavators 7, 8, 9 as working machines, respectively, were sent to the server 1 via the communication satellite 6. As an alternative, these informations may be sent using ground waves which are employed by cellular telephones and the like.

INDUSTRIAL APPLICABILITY

According to the present invention embodiment, when an operator of any one of working machines simply operates its transmission instructing means as needed, a preset message is sent to the corresponding user company as described above. The user company can, therefore, take a measure in response to the communicated information without delay.

According to the present invention, the user company to which the information has been transmitted can also determine the current position of the working machine from which the information was transmitted, thereby making it possible to take a measure in response to the communicated information more promptly without delay.

According to the present invention, an administration center can rewrite a message as desired corresponding to the details of work or the frequency of transmissions of the message, thereby making it possible to efficiently take a measure in response to the communicated information.

The invention claimed is:

1. A communication system for working machines, said system comprising:
   controllers arranged on said working machines, respectively, for transmitting predetermined information from said respective working machines,
   a control station arranged at a remote location and connected to said controllers via radiocommunication such that said predetermined information outputted from each of said controllers is inputted in said control station, and
   a plurality of user stations connected to said control station via a network, wherein:
   each of said working machines is provided with a transmission device operated by an operator thereof which instructs a respective controller to transmit the corresponding predetermined information to the control station; and
   said control station is provided with a terminal information database in which terminal information is stored, a customer information database in which a plurality of mail texts having desired content individually set as desired by each user station customer are stored, a terminal identification module to identify from said corresponding predetermined information and from said terminal information a corresponding one of the user stations to which the corresponding text having the desired content is to be transmitted, a selection module by which the text having the desired content is selected from the customer information database, and a transmitter providing output to said corresponding one of the user stations identified by said terminal identification module.

2. The communication system according to claim 1, wherein said predetermined information from said respective working machines includes identification information specific to said working machine.

3. The communication system according to claim 2, wherein information on all the working machines and all user station customers is stored in said terminal information database.

4. The communication system according to claim 3, wherein an individual working machine administration center is specified by said terminal information database on a basis of corresponding identification information stored therein.

5. The communication system according to claim 1, wherein said control station is provided with a selector to select the text corresponding to a specified administration center from said customer information database.

6. The communication system according to claim 5, wherein said specified administration center can rewrite, from the corresponding user station, said text stored in said customer information database.

7. The communication system according to claim 1, wherein each of said working machines is provided with a position detecting means for detecting a current location of said working machine, and said predetermined information includes information on said location.

8. The communication system according to claim 7, wherein said information on said current location is included in said information transmitted by said transmitter.

* * * * *